Reissued Apr. 1, 1975 Re. 28,381

INVENTOR.
ALDEN P. EDSON

BY

M. L. Pinel
ATTORNEY

April 1, 1975

Re. 28,381

INVENTOR.
ALDEN P. EOSON

BY

M. L. Pinel
ATTORNEY

April 1, 1975

Re. 28,381

INVENTOR.
ALDEN P. EDSON

BY

M. L. Pinel
ATTORNEY

United States Patent

Re. 28,381

Reissued Apr. 1, 1975

28,381

MAGNETOSTRICTIVE APPARATUS AND PROCESS

Alden P. Edson, Colorado Springs, Colo., assignor to The International Nickel Co. Inc., New York, N.Y.

Original No. 3,634,742 dated Jan. 11, 1972, Ser. No. 48,377, June 22, 1970. Application for reissue Dec. 26, 1973, Ser. No. 428,108

Int. Cl. H01v 9/00

U.S. Cl. 318—118 15 Claims

Matter enclosed in heavy brackets [ ] appears in the original patent but forms no part of this reissue specification; matter printed in italics indicates the additions made by reissue.

ABSTRACT OF THE DISCLOSURE

Electromechanical transducer core containing magnetostrictive material is energized by two electromagnetic fields which are oriented transversely to each other and controlled to vary the direction of magnetization of the core cyclically and vibrate the core by longitudinal and transverse magnetostriction to convert electrical power to mechanical power; conversion of mechanical to electrical power can be obtained by converse magnetostrictive action.

The present invention relates to electromechanical conversion of power and more particularly to magnetostrictive apparatus and processes for interconverting electrical and mechanical power.

It is well known that magnetostrictive effects, including the Joule effect (change in length when a ferromagnetic rod is placed in a longitudinal magnetic field) and the Villari effect (change in magnetic condition when a magnetized ferromagnetic rod is subjected to longitudinal stress), and also other magnetostrictive effects, can be utilized for converting electrical power to mechanical power and vice versa. Magnetostrictive transducers have been particularly useful for converting alternating electric current power to oscillatory (or vibratory) mechanical energy, including acoustical energy. For instance, magnetostrictive transducers comprising a coil wound on a cylindrical ring have been found useful for generating sonar and other underwater sound and magnetostrictive transducers comprising elongated rods with helical coils wound circumsferentially around the rods have been useful for driving vibratory tools, e.g., ultrasonic vibratory drills, welders and soldering irons and ultrasonic cleaners. The magnetostrictive material is usually the major, or at least a very substantial, proportion of the weight and volume of a magnetostrictive transducer and thus, where greater magnetostrictive power is needed, it is highly desirable to increase the power capacity without increasing the amount of magnetostrictive material in the transducer. Generally, the magnitude of mechanical power obtainable from a vibratory magnetostrictive transducer depends largely upon the frequency of vibration and upon the total amplitude of the vibration obtained from the magnetostrictive strain, e.g., change in length divided by original length. Inasmuch as the vibration frequency is often limited in practice by mechanical factors, e.g., inertia and resonant frequency, and by electrical factors, e.g., inductive reactance, and inasmuch as in some particularly important instances, such as in generation of acoutic energy, frequency requirements are imposed by needs relating to receiver apparatus or to sound effects, including unpleasant audible sound, or to signalling, cavitation thresholds, or others, improvements that provide increases in amplitude of magnetostrictive strain are of major or even paramount importance where increases in magnetostrictive power are required. The extent to which the amplitude of magnetostrictive strain can be increased by increasing the electric power input is limited inasmuch as magnetostriction reaches saturation when the flux is increased beyond certain more or less definite levels depending upon the core materials. Saturation magnetostriction is a property that is usually anisotropic when measured on a single crystal and thus has different values when measured in different crystallographic directions. With polycrystalline materials the apparent, useable, magnetostriction is generally an average of the increments of magnetostrictive strain occurring simultaneously in a number of variously oriented crystals. Accordingly, magnetostrictive characteristics, including saturation magnetostriction, of polycrystalline materials are isotropic (or practically isotropic) in some instances and are anisotropic in others, depending upon the crystalline structure of the material, which in turn is frequently dependent upon the prior metallurgical processing of the material. Yet, regardless of whether a magnetostrictive material is isotropic or anisotropic and even though some advantages may have been obtained from favorable crystallographic orientations, saturation magnetostriction imposes restrictive limitations on the power conversion capabilities of magnetostrictive transducers. Usually there is little or no difficulty in providing as much, and even more, electrical power than a given magnetostrictive transducer can effectively convert to mechanical power at its saturation level and, thus, where increased magnetostrictive power is needed, it is highly desirable to increase the power output obtainable from a given volume or weight of core material even though the increased mechanical power output requires an increase in the electrical power input. Accordingly, major problems in obtaining increased mechanical power from magnetostrictive transducers involve attainment of relatively high levels of mechanical energy per unit of magnetostrictive material under saturation operation conditions and also involve achievement of relatively high total amplitude of magnetostrictive strain when the core flux is varied in cycles up to the level of magnetostricitve saturation.

Additionally, in order to obtain advantageously good performance of magnetostrictive transducers operated at high levels of power output per unit volume of magnetostrictive material (power output density) it is highly desirable to obtain good electromechanical linearity (similarity of wave shape between excitation voltage and magnetostrictive stress or strain) and high electromechanical efficiency of converting electrical input power to mechanical output power; also, good electromechanical coupling is beneficial in order to avoid detrimentally large degradation of electromechanical performance in event operating frequencies unavoidably or undesirably depart from resonance frequencies. Further desirable characteristics of high-power magnetostrictive transducer systems include compatibility with a broad range of magnetostrictive materials including pure metals, alloys and ferrites, suitability for excitation from a single-phase alternating current source, substantially resistive electrical input impedance under conditions of mechanical resonance and, also, capability for successful operation without necessity of providing magnetic bias to the core, thus avoiding necessity of providing direct-current power or high-coercivity materials such as permanent magnets.

Difficulties in obtaining increased power output densities are closely linked and interwoven with needs for obtaining high electromechanical efficiency and linear relationship of power input to power output. For instance, when attempting to increase the power output by increasing the power input, if an alternating-current excitation field is increased to the extent that the magnitude of the flux of the excitation field exceeds the polarization flux of the magnetostrictive material, rectification distortion produces a large mechanical power component at higher harmonics of the electrical excitation frequency.

Although many attempts were made to increase the amounts of power that could be converted by magnetostrictive transducers without requiring increased amounts of magnetostrictive materials in the transducers and some success has been achieved, such as by providing materials having specially desirable magnetostrictive characteristics and/or by providing special electrical arrangements such as static polarization aligned with the axis of excitation, there are still unfulfilled needs for obtaining greater power output densities from magnetostrictive materials and for avoiding disadvantages of operating at power levels above saturation limits of available magnetostrictive materials.

There has now been discovered a new method and a new apparatus for using magnetostrictive material to obtain desirable conversion of electrical energy to mechanical energy or of mechanical energy to electrical energy.

It is an object of the present invention to provide apparatus for electromechanical conversion of power.

Another object of the invention is to provide a process for electromechanical conversion of power.

Other objects and advantages will become apparent from the following description taken in conjunction with the accompanying drawing in which.

Figure 1:
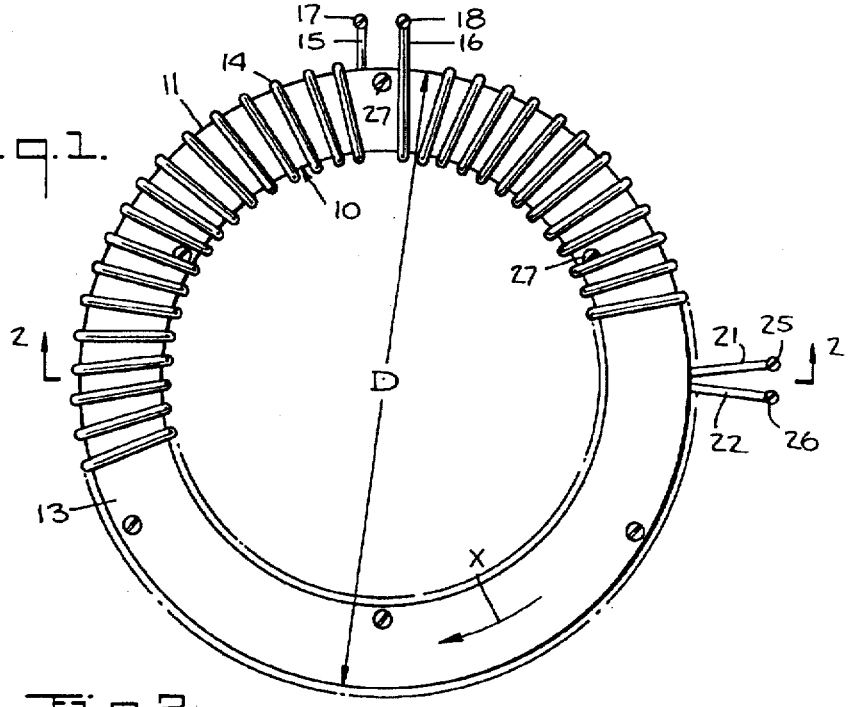
FIG. 1 illustrates a plan view of an electromechanical transducer in accordance with the invention.

The present invention contemplates electromechanical vibration of a core containing magnetostrictive material by applying two mutually transverse electromagnetic fields to the core and cyclically varying the flux density of at least one of the fields to angularly oscillate the direction of magnetization of the core so as to swing the instantaneous direction of magnetization angularly back and forth through an angle of up to 90° in one oscillation cycle at a cyclic frequency the same as the cyclic frequency of the cyclically varying field. Most advantageously, and usually, the mutually transverse fields applied to the core are perpendicular to each other (orthogonal) and thus have flux paths intersecting mutually perpendicularly (orthogonally) within the magnetostrictive core material. The invention also provides magnestostrictive transducer apparatus comprising a magnetostrictive core and two coils adapted to apply mutually transverse electromagnetic fields to the core and further provides apparatus for transmitting and controlling electric current through the coils, with cyclically varying current transmitted through at least one of the coils, to produce transverse electromagetic fields providing an angularly oscillating resultant magnetizing field in the core and magnetostrictively vibrate the transducer core.

In some specially advantageous embodiments the invention provides magnetostrictive transducer apparatus comprising a core component containing magnetostrictive material, two mutually transverse coils arranged to apply two orthogonal electromagnetic fields to the core and means for transmitting cyclically varying electric current through the two coils and controlling the flow of electric current in the coils to provide that the coil currents vary in an out-of-phase relationship whereby the electromagnetic flux linking one coil to the core is increasing while the flux linking the second coil to the core is decreasing or is substantially constant or zero. In the form most advantageous for use at very high levels of power, the electromagnetic flux linking the first coil to the core is increased from near zero to near saturation while the flux linking the second coil to the core is decreased from near saturation to near zero, and thereafter the flux linking the first coil is decreased to low or zero density while the flux from the second coil is increased to near saturation levels. Coils for applying electromagnetic fields in accordance with the invention can be disposed around or within the core, or otherwise, e.g., transaxially, provided that the coil can direct electromagnetic flux into the core material.

Electrical power for the transverse fields can be provided, especially for certain advantageous embodiments, by electrically energizing a pair of transverse coils with current from an alternating-current source, e.g., a vacuum tube oscillator or a rotary alternator, and controlling the flow of current with a pair of rectifiers arranged to direct the electric current from the alternating-current source unidirectionally through one coil during one portion of the alternating cycle and then through the other coil during another portion of the alternating-current cycle and thereby cyclically increase the flux in one coil while the flux in the other coil is decreasing (or is reduced to a negligible value) and then increase the flux in the second coil while decreasing the flux in the first coil.

The magnetostrictive core desirably has a configuration that provides a continuous path of uniform cross section around a central opening, such as the configuration of a torus or modifications thereof, including a hollow annulus and hollow annular cylinders and also rectilinear or other symmetrical modifications of toroidal configurations. Configurations known as picture frames, windows, scrolls and doughnuts can be used. Also, core components for the invention can have elongated configurations such as those of a rod or a tuning fork. For devices wherein an elongated form of core, such as a straight rod, is needed it is beneficial to provide two rods in parallel and provide magnetic pole conductors across the ends of the rods to obtain a continuous flux path.

In general, magnetostrictive materials that are satisfactory for magnetostrictive cores in the present invention are bilinear magnetostrictive materials in the sense that a bilinear magnetostrictive material is characterized by dimensional changes in two mutually perpendicular directions both parallel to and at right angles to the applied field when undergoing magnetostriction in a varying magnetic field and, also, the perpendicular dimensional changes in the material are opposite in sign in the sense that an increase in length is accompained by a transverse dimensional decrease and a decrease in length is accompanied by an increase in the transverse dimension, e.g., the known magnetostriction characteristics of nickel at low field strengths up to about 50 oersteds. Usually the magnetostrictive materials utilized herein are characterized by very substantial amounts of Joule magnetostriction, e.g., saturation Joule magnetostrictive strain of at least about 10 parts per million, and very little or practically no volume magnetostriction; if the material exhibits any volume magnetostriction during a magnetostrictive change in length, the percent change in volume is smaller than the percent change in length. Accordingly, it is to be understood that during magnetostrictive deformation of a bilinear magnetostrictive material in a magnetic field, when the material contracts parallel to the axis of the magnetic field the material simultaneously expands transversely perpendicular to the axis of the magnetic field and when the material expands parallel to the axis of the field the material simultaneously contracts transversely perpendicular to the axis of the field. During constant-volume bilinear magnetostriction in isotropic material the linear magnetostrictive strain perpendicular to the direction of magnetization is approximately half as large as the linear magnetostrictive strain along the axis of magnetization.

Materials having bilinear magnetostrictive characteristics such as the Joule magnetostriction characteristic of annealed randomly polycrystalline nickel are generally satisfactory for use as the core material in transducers in accordance with the invention. Other satisfactory or advantageous bilinear magnetostrictive materials for the core include randomly polycrystalline alloys nominally containing 2.2 percent chromium with balance nickel, 4.5 percent cobalt with balance nickel, 45 percent nickel and 55 percent iron, 50 percent cobalt and 50 percent iron, aluminum-iron alloys known as Alfenol, e.g., 12 percent aluminum with balance iron, alloys containing 0.9 percent to 3.6 percent chromium, up to 3.6 percent cobalt with balance nickel described in U.S. Pat. No. 3,146,380; also utilizable are magnetostrictive ceramics including bilinear magnetostrictive ferrite compositions such as the $Me^{2+}[F_2O_4]$ type, e.g., ferroxcube, and including nickel, zinc, cobalt and/or copper ferrites, e.g., a ferrite composition corresponding to the formula $$(N_{0.90}Zn_{0.10})_{0.876}Co_{0.024}Cu_{0.10}Fe_2O_4$$

Anistropic materials may be utilized in the core and in such instances the applied magnetic fields may be advantageously aligned in the direction of greatest saturation linear magnetostriction characterizing the anisotropic material.

Figure 2:
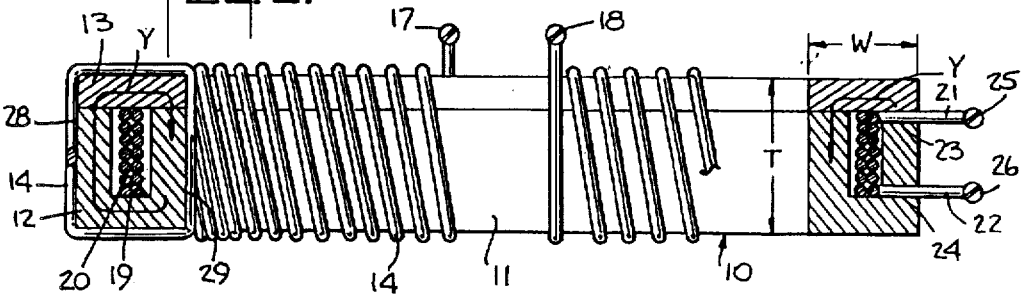
FIG. 2 illustrates a cross-sectional view of the transducer of FIG. 1 taken along line 2—2 of FIG. 1.
Figure 3:
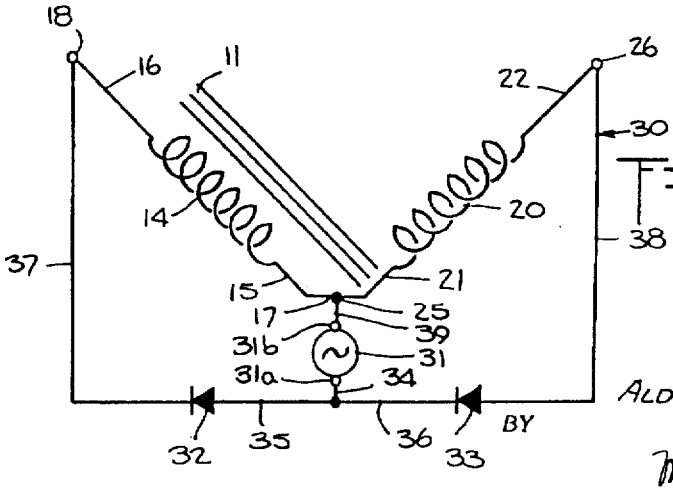
FIG. 3 shows a schematic diagram of an electric circuit suitable for operating a transducer in accordance with the invention.

Referring now to the drawing, FIGS. 1, 2 and 3 illustrate particularly advantageous magnetostrictive apparatus within the invention. As shown in FIGS. 1 and 2, magnetostrictive transducer 10 comprises magnetostrictive core 11 which is of a hollow annulus configuration and includes the core components shown as channel section ring 12 and cover plate 13. Ring 12 and cover 13 are made of a bilinear magnetostrictive metal, e.g., high-purity nickel. Toroidal coil 14 is wound around the magnetostrictive core and has leads 15 and 16 to terminals 17 and 18 respectively. The core ring has a continuous annular cavity which is illustrated in cross section by internal cavity 19 in FIG. 2. Coil 20 is wound annularly within the internal cavity in the core and has leads 21 and 22 which extend from the coil through sealed passages 23 and 24 to annular coil terminals 25 and 26 respectively.

In the present instance of the embodiment illustrated in FIGS. 1 and 2, the cover plate and the ring components of the magnetostrictive core are rigidly attached together, in metal-to-metal contact, with six brass screws, shown as screw 27. It is desirable to avoid having any nonmagnetic material between the ring and the cover and thus avoid or minimize any nonmagnetic gap therebetween. For obtaining good magnetostrictive operating characteristics with embodiments of the invention having annular coils disposed coaxially within magnetostrictive rings such as illustrated in FIGS. 1 and 2, it is highly beneficial to have a completely continuous magnetic path (without nonmagnetic gaps) around the annular coil, e.g., as illustrated by the arrows around coil 20 in FIG. 2, insofar as permitted by eddy current phenomena. However, electrically insulating laminations may be needed in many instances, especially for operation at high sonic or ultrasonic frequencies when using low electrical resistivity materials such as metals and alloys for the core, in order to inhibit eddy current flow. If the ring and the core are bonded together with a braze or a cement therebetween it is beneficial for the braze or the cement to be thin or have good magnetic permeability characteristics.

An advantageous electric circuit for energizing the transducer illustrated in FIGS. 1 and 2 and also other transducers of the invention is illustrated in FIG. 3, which shows circuit 30 comprising alternating-current source 31 electrically connected to half-wave rectifiers 32 and 33, e.g., silicon diode semiconductors, with common lead 34 connecting source terminal 31a to branch leads 35 and 36, which lead to rectifiers 32 and 33 respectively. The alternating-current source and the rectifiers are connected in opposed parallel arrangement to two mutually orthogonal coils associated with a magnetostrictive core in a transducer of the invention. Viewing FIG. 3 in the light of FIGS. 1 and 2, FIG. 3 shows rectifier 32 connected by lead 37 to terminal 18 of coil 14 and rectifier 33 connected by lead 38 to terminal 26 of coil 20; terminals 17 and 25 of coils 14 and 20, respectively, are connected by lead 39 to source terminal 31b of AC source 31. (It is to be understood that in FIG. 3 the illustrations of coils 14 and 20 are symbolic and that the actual positions of the coil windings in relation to each other and to the core in the embodiment of an annular transducer are illustrated in FIGS. 1 and 2.) It is to be especially noted that rectifiers 32 and 33 and the alternating current source are arranged in combination to transmit unidirectional current from the alternating source alternately through coil 14 and then through coil 20, respectively, and produce two cyclically varying (or fluctuating) electromagnetic fields of flux, one field around each coil, and to cyclically vary the flux densities of the two fields with the field strengths increasing and decreasing in a 180° out-of-phase relationship to each other. For instance, during operation with circuit 30 powered by alternating-current source 31, e.g., a vacuum tube oscillator having a sinusoidal voltage output characteristic, in a portion of the cycle when the instantaneous voltage potential at source terminal 31a is positive in respect to source terminal 31b, current flows from 31a through rectifier 32 and coil 14 and produces an electromagnetic field that couples coil 14 with magnetostrictive core 11 and permeates the core circumferentially. The circumferential field produced from coil 14 permeates the core with magnetic flux in a circular path coaxially between the coaxial circles that illustrate the inner and outer circumferences of core 11 in the plan view of FIG. 1, e.g., the coaxially annular, circumferential, flux path indicated in part by arrow X on FIG. 1. In another portion of the cycle, when the potential at terminal 31b is positive in respect to terminal 31a, current flows from 31b through coil 20 and rectifier 33 and produces an electromagnetic field that couples coil 20 with core 11 and permeates the core toroidally. The field produced from coil 20 permeates the core with flux following a toroidal path around the cross section of coil 20 illustrated in FIG. 2, e.g., the toroidal flux path indicated in part by arrow Y on FIG. 2.

In view of the foregoing description pertaining to transducer 10 and circuit 30, it is evident that flux in the circumferential field produced by current in coil 14 is oriented perpendicularly to flux in the toroidal field produced by current through coil 20. Thus, when current from the alternating-current source is passed through the rectifiers and the combination of coils 14 and 20 with core 11 illustrated in FIGS. 1, 2 and 3, an orthogonal pair of cyclically fluctuating electromagnetic fields with flux paths intersecting mutually perpendicularly in a magnetostrictive core are produced, and the core is subjected to oscillatory 180° out-of-phase orthogonal excitation, and the direction of magnetization is angularly oscillated through a 90° angle, thereby magnetostrictively vibrating the core.

Hereinafter coils and magnetic fields corresponding to coil 14 and the circumferential field emanating therefrom may be referred to as the X-coil and the X-field; and, similarly, coils and fields corresponding to coil 20 and the toroidal field emanating therefrom may be referred to as the Y-coil and the Y-field, respectively.

Orthogonal excitation of cores containing bilinear magnetostrictive materials, with the orthogonal excitation controlled to have the fields fluctuating in an out-of-phase relationship in accordance with the invention, provides special magnetostrictive strain results, particularly including especially high total-amplitude strain, that are beneficial for powering vibratory devices, e.g., electroacoustic radiators. For instance, with core 11 made of randomly polycrystalline nickel, when toroidal coil 14 is energized by passing current through the coil and a circumferential field is thus created and permeates the core, the circumferential field produces longitudinal magnetostrictive strain in the core within the coil; this strain produced by the circumferential field is referred to as longitudinal strain inasmuch as the increment of strain through a given turn of the toroidal coil is aligned with the central axis of that turn of the coil. Longitudinal magnetostrictive strain resulting from creation of the circumferential field contracts the circumference of core 11, when made of nickel, inasmuch as the longitudinal magentostrictive strain of nickel is negative (contraction) when subjected to a longitudinal magnetic field. Of course, contraction of the circumference of the core also decreases the diametric dimensions of the core, e.g., the outside diameter dimension D shown on FIG. 1. With the core made of material such as randomly polycrystalline nickel the circumferential field also produces transverse magnetostrictive strain which is positive (expansion) and results in enlargement of cross-sectional dimensions of the core, particularly including increases in the width and thickness of the core ring, e.g., increases in the width dimension W and the thickness dimension T shown on FIG. 2. In the present instance the dimensional changes resulting from the transverse magnetostrictive strain produced by the circumferential field are relatively small inasmuch as this transverse strain occurs across relatively short dimensions of the core.

During the cycle of alternating current from source 31 the strength of the circumferential field is increased to a maximum and then decreased and, accordingly, the longitudinal magnetostrictive strain produced by the circumferential field is increased and then decreased and, as a result of the increase and decrease of the circumferential field, core 11 is circumferentially contracted and then released.

Circuit 30 maintains a 180° out-of-phase relationship between the fluctuation of the circumferential field intensity and the fluctuation of the toroidal field intensity. Accordingly, after the circumferential field has passed its maximum, the strength of the toroidal field is increased and reaches a maximum while the circumferential field is minimal or zero, thus swinging the axis of magnetizaiton through a 90° angle.

The toroidal field produces magnetostrictive strain having a longitudinal strain component which is negative and contracts the cross section of the core metal around coil 20, thus decreasing the core cross-sectional dimensions W and T. The decreases in dimensions W and T resulting from the longitudinal strain produced by the toroidal field are relatively small in the present instance inasmuch as the longitudinal strain produced by the toroidal field is directed along these relatively short dimensions.

More importantly, the magnetostrictive strain produced by the toroidal field also has a transverse component which is positive and directed circumferentially around the core and thus results in expansion of the circumference and diameter of the core. The transverse magnetostriction produced by the toroidal field is particularly important inasmuch as it occurs around the relatively long, circumferential, dimension of the core and is phase controlled to produce the maximum amplitude of radial and circumferential expansion at times when the circumferential field is exerting only the minimum or no contractive effect and thus the transverse magnetostriction produced by the toroidal field increases the amplitude of the change in the diameter of the core during the alternating-current cycle. Accordingly, during repeated cycles of current from the oscillator, the cyclic contraction and expansion of the core circumference vibrates the core radially and, with reference to output power in the present instance, the effective amplitude of the radial vibration is the peak-to-peak amplitudes extending between the peak of the radial contraction resulting from longitudinal magnetostrictive strain produced by the circumferential field to the peak of the radial expansion resulting from transverse magnetostrictive strain produced by the toroidal field and thus the effective amplitude of vibration is enhanced by both of the fields. Radial vibration of core 11, which moves the cylindrical face surfaces 28 and 29 of the core alternately inwardly and then outwardly, provides mechanical power that can be applied to fluids in order to generate acoustic waves or, inter alia, used to vibrate tools or other mechanical devices.

It is highly advantageous, especially for achieving maximum power output density, to have the transducer and power source circuit adapted, e.g., by controlling the current through the transducer coils and the number of turns in the coils, to provide that the peak flux densities of each of the fluctuating transverse fields is equal, or essentially equal, to the saturation magnetostriction flux density level of the core material that is electromagnetically coupled with the field. As a practical matter, to attain high power output density and yet avoid incurring detrimental wave distortion due to oversaturation, the peak flux density is advantageously controlled to reach as high a level as it is practical to control without exceeding the magnetostriction saturation level. In reference to magnetic domain theory, the invention may be viewed as providing for angularly oscillating the magnetic domain axes through a 90° angle to develop magnetostrictive strain in the core material. The rectifier-controlled power circuit adapted for transmitting unidirection currents fluctuating cyclically 180° out of phase through the orthogonal coils of the transducer, e.g., as illustrated in FIG. 3, has special advantages, in addition to providing for energizing the fields up to and essentially equal to the magnetostriction saturation level, of providing for oscillating the magnetization axis through a full 90° angle without practical risk of exceeding 90° oscillation and of providing high power output density without need for static biasing field apparatus and, also, is particularly advantageous for overcoming difficulties or disadvantages such as flux reversal, magnetic saturation and hysteresis.

For some special purposes, e.g., trepanning, torsional output can be advantageous and, in such event, can be obtained by providing a continuous thin slit through a wall of cavity 19 and parallel to the conductors of coil 20, although this is not advantageous from the viewpoint of having a continuous flux path.

Figure 4:
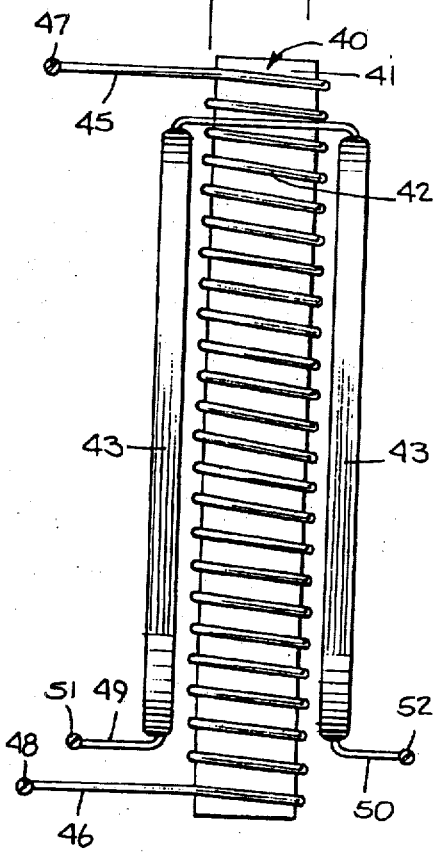
FIG. 4 shows a side view of another electromechanical transducer of the invention.
Figure 5:
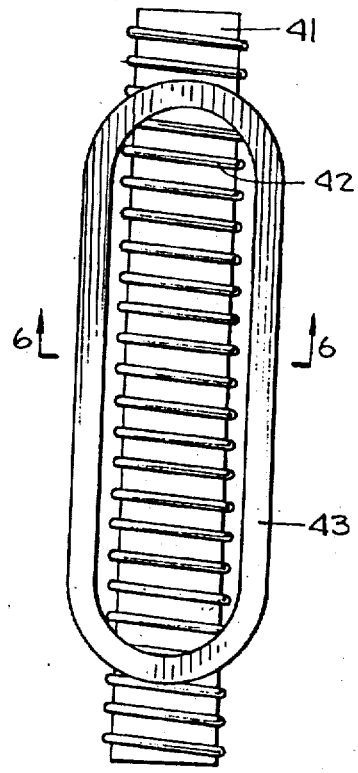
FIG. 5 shows a plan view of the transducer of FIG. 4.
Figure 6:
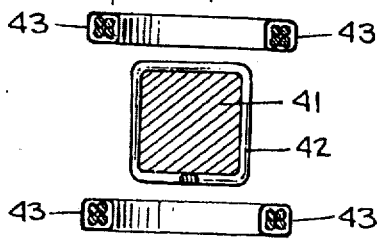
FIG. 6 shows a cross-sectional view of a transducer of FIGS. 4 and 5 taken along line 6—6 of FIG. 5.

Referring again to the drawing, FIGS. 4, 5 and 6 respectively depict a side view, a plan view and a cross-sectional view of magnetostrictive transducer 40, which comprises elongated solid rod core 41 and orthogonal coils 42 and 43. Core 41 is composed of a bilinear magnetostrictive metal, e.g., stress-relieved randomly polycrystalline nickel, and is of a configuration having a uniform cross section and a length substantially greater than the greatest cross-sectional dimensions, e.g., length of at least 2 or 3 times the greatest cross-sectional dimension. Coil 42 with leads 45 and 46 and terminals 47 and 48, respectively, is wound toroidally (or helically) around the core and adapted to conduct current to apply an electromagnetic field longitudinally to the core when current is passed through the coil. Coil 43 with leads 49 and 50 having lead terminals 51 and 52 is wound in an elongated loop configuration and divided in two equal mutually parallel sections that are adapted to conduct current to apply an electromagnetic field transversely, perpendicularly in the present instance, to the longitudinal axis of the core. Transducer 40 can be operated to perform the process of the invention by passing unidirectional electric current alternately, in repetitive cycles, through coil 42 and then through coil 43 to produce cyclically varying electromagnetic fields coupling each coil to the core and by also controlling the current to vary the strengths of the fields in relation to each other in an out-of-phase relationship, advantageously 180° out of phase. For instance, transducer 40 can be connected and operated in circuit 30, illustrated in FIG. 3, with coils 42 and 43 of transducer 40 in place of coils 14 and 20, respectively, of transducer 10. With such an arrangement, when power is applied from the alternating current source, current through coil 42 results in longitudinal contraction of core 41 due to longitudinal magnetostriction in the field from coil 42 during one part of the AC cycle of current from source 30 and, alternately, during another part of the cycle, current through coil 43 results in longitudinal expansion of the core due to transverse magnetostriction in the field from coil 43. Thus, the core vibrates longitudinally with the amplitude of the longitudinal vibration being a combination of the magnetostrictive contraction and the alternate magnetostrictive expansion.

Optionally, capacitance and/or inductances can be added to the illustrated apparatus in order to adjust the phase relationships of voltages and currents. For instance, a tuning capacitor can be connected across terminals 31a and 31b of current source 31 to adjust the overall power factor of circuit 30; and/or tuning capacitors can be provided across coils 14 and/or 20 (individually); and/or, inductors can be inserted into lead 16 and/or 21 of coils 14 and 20 of transducer 10 in order to balance power factors in the excitation branches of the circuit or to adjust bandwidth.

For purposes of giving those skilled in the art a better understanding of the invention and a better appreciation of the advantages of the invention, the following illustrative examples are given.

A magnetostrictive transducer which was constructed in accordance with the invention (and is referred to herein as transducer TA) comprised a cylindrical annular core that was composed of a bilinear magnetostrictive metal and had a continuous annular cavity enclosed by the magnetostrictive metal, a first coil (the X-coil) wound toroidally around the core and a second coil (the Y-coil) wound annularly in the cavity. The structure and configuration of the core and the dispositions of the coils were as illustrated in FIGS. 1 and 2. The channel section ring and the cover plate of the core were made of an annealed high-purity grade of nickel known as nickel 270 nominally containing 99.98 percent nickel, 0.01 percent carbon and less than 0.001 percent each of manganese, iron, sulfur, silicon, copper, chromium, titanium, cobalt and magnesium and were tightly attached together with brass screws. An energizing circuit comprising a vacuum tube oscillator and two silicon semiconductor diode rectifiers arranged as illustrated in FIG. 3 was connected to transducer TA. Electric current was transmitted through the transducer coils in the circuit with the vacuum tube oscillator delivering alternating current at 77 hertz (Hz.) while the transducer was submersed in water and, thus, the magnetostrictive core was subjected to oscillatory orthogonal excitation with the coil currents fluctuating cyclically in a 180° out-of-phase relationship and, at the same time, vibration ripples and splashing of the water clearly confirmed that the core was vibrating and transmitting underwater sound vibrations. Electronic micrometer measurements of the core showed the core was vibrating radially with strain amplitude up to about $28\times10^{-6}$, depending upon the peak excitation current, which was intentionally varied in order to observe the increase in vibrational effect with increase in current. While the amplitude of vibration was increased up to the limit reliably measureable with the measurement apparatus, the results showed that the saturation magnetostriction limit was substantially higher. Further, in order to compare results of the orthogonal excitation method of the invention in contrast to results from unidirection single-coil excitation not in accordance with the invention, transducer TA was operated in three modes with the peak excitation currents and the frequency (77 Hz.) being the same for each mode; XY-mode with both coils excited in accordance with the invention; X-mode with only the X-coil excited; and Y-mode with only the Y-coil excited. Electronic micrometer measurements showed that the XY-mode with orthogonal excitation in accordance with the invention resulted in obtaining a peak-to-peak strain amplitude that was about 36 percent greater than the peak-to-peak strain amplitude obtained with the X-mode and about 500 percent greater than the peak-to-peak strain amplitude obtained with the Y-mode. Moreover, the electronic micrometer measurements showed that the peak-to-peak radial amplitude of vibration in the XY-mode was clearly greater than the sum of the peak-to-peak radial amplitudes of the vibration in the X-mode and in the Y-mode. Also, electromechanical linearity of the XY-mode was markedly superior to the other modes.

In the present invention, hollow-cored embodiments having an interior coil have special advantages, including advantageously good coupling and electromechanical efficiency, arising from the continuous flux path provided around the interior coil. For example, where an elongated core embodiment is needed to obtain high amplitude of strain along a desired direction, the hollow annular core embodiment illustrated in FIGS. 1 and 2 and exemplified by transducer TA can be made with the hollow core in the form of an elongated loop instead of the circular form illustrated by the plan view of FIG. 1, or can be made in the form of an elongated slender cylinder, such as a hollow annulus with a high ratio of length to diameter or, in terms of the dimensions T and D illustrated in FIGS. 1 and 2, with a T:D ratio of at least about 1:1, e.g., T:D ratios of 2:1 or 3:1 or up to 10:1 or higher. When the T:D ratio is increased to be greater than the T:D ratio of the configuration illustrated in FIGS. 1 and 2, the peak-to-peak axial dimensional displacement, or axial amplitude, of vibration resulting from the transverse magnetostrictive strain produced by the circumferential field and the longitudinal magnetostrictive strain produced by the toroidal field becomes greater and more useful; for magnetostrictive drivers to produce axial vibrations for acoustic sounders or vibratory tools the T:D ratio is desirably about 1.5:1 to about 5:1.

It will be understood that transducers of the invention can be operated in arrays in combinations with each other, e.g., stacks of ring core transducers such as illustrated in FIGS. 1 and 2, with or without air gaps or other low permeability gaps or with high permeability spacers between the transducers, or parallel arrays of rod core transducers, such as illustrated in FIGS. 4, 5 and 6, advantageously with high permeability couplers magnetically connecting the ends of the rods.

Figure 7:
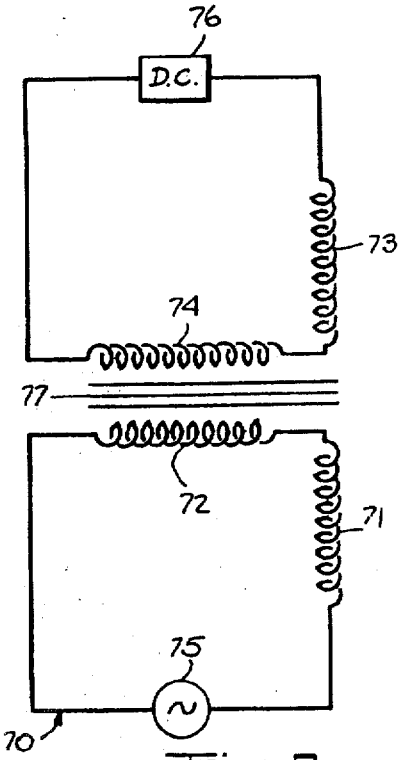
FIG. 7 shows a schematic diagram of an electric circuit comprising a transducer provided by the invention and electric power sources for energizing the transducer.

FIG. 7 along with FIGS. 8a through 8d, which are to be viewed in conjunction with each other, depict another power circuit, and electromagnetic functioning thereof, that can be employed in orthogonal excitation of magnetostrictive transducers provided by the invention. FIG. 7 shows circuit 70 comprising mutually orthogonal coils 71 and 72 connected in series to alternating-current source 75 and also comprising mutually orthogonal coils 73 and 74 connected in series with controllable constant-current direct-current power source 76. Coils 71 and 72, which are the cyclic field coils, are arranged in conjunction with source 75 and bilinear magnetostrictive core 77 to produce two cyclically fluctuating electromagnetic fields having flux paths intersecting mutually perpendicularly within core 77. The other pair of coils, 73 and 74, which are the constant field coils, are arranged in conjunction with source 76 to produce two constant electromagnetic fields having flux paths intersecting mutually perpendicularly within core 77. For instance, the core and coils illustrated symbolically in FIG. 7 can be in the configuration and arrangement of the core and coils illustrated in FIGS. 4, 5 and 6, with coils 72 and 74 in the place of coil 42 and with coils 71 and 73 in the place of coil 43, or vice versa. Or, more advantageously, the core and coils depicted in FIG. 7 conform to the structure of the annular transducer illustrated in FIGS. 1 and 2 and, in an example of such a transducer and an example of a process comprising using such a transducer in circuit 70 (referred to hereinafter as transducer TB and process TB respectively), core 77 has the hollow annular configuration of core 11, coils 72 and 74 are wound together toroidally around the core ring in place of coil 14, and coils 71 and 73 are wound together annularly within the core in place of coil 20. Thus, according to the designations of coils and electromagnetic fields as "X" or "Y" coils or fields referred to hereinbefore, when referring to transducer and process TB, coils 72 and 74 and the fields respectively therefrom are the X, or X2 and X4 respectively, coils and fields; and, coils 71 and 73 and the fields respectively therefrom are referred to as the Y, or Y1 and Y3 respectively, coils and fields. Coils 71 and 72 are matched to produce mutually equal flux densities (B) when energized by the equal flows of current, and coils 73 and 74 are likewise equally matched to each other but not necessarily to coils 71 and 72. The four coils and the leads thereto in circuit 70 are specially wound and connected to provide that when the flow of alternating current through the coil 72 is in the same toroidal direction around the core as the flow of direct current through coil 74, then, at that instant of time, the flow of alternating current annularly within the core through coil 71 is opposite to the direction of the annular flow of direct current in coil 73 and, thus, the circuit is arranged to provide that when the flux from coil 72 reenforces the flux from coil 74, the flux from coil 71 opposes the flux from coil 73 (and vice versa); with this arrangement the alternating field coils are connected in opposition to each other in relation to the constant field coils.

Figure 8A:
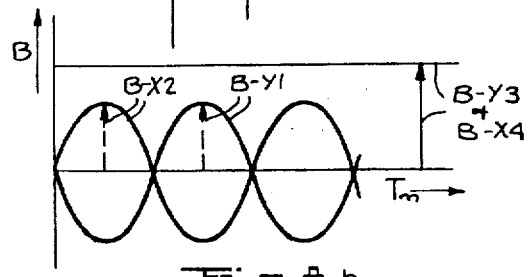
FIGS. 8a, 8b, 8c and 8d are vector diagrams depicting flux densities (B), or induction, of electromagnetic fields applied in special embodiments of the process of the invention.
Figure 8B:
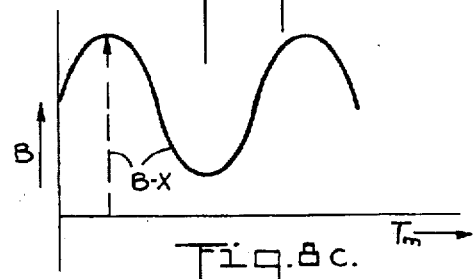
Figure 8C:
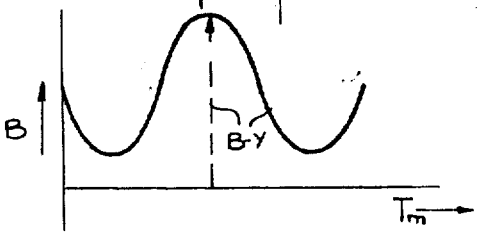

Electromagnetic vectors and fields produced from coils in transducer TB during process TB are depicted in FIGS. 8a through 8d. Herein, solid line vectors depict constant density fields and broken line vectors depict fluctuating (or alternating) density fields. FIG. 8a illustrates the cyclically fluctuating flux densities B–X2 and B–Y1, versus time (Tm), produced from coils 72 and 71 respectively when energized by alternating current from source 75. FIG. 8a also illustrates the constant flux densities B–Y3 and B–X4 which are produced from coils 73 and 74 when energized by constant direct current from source 76 and which are maintained at least as great in magnitude and, as a practical matter, advantageously a small amount greater, e.g., 5 percent greater, than the peak flux densities of the fluctuating fields in order to avoid detrimental flux reversal effects. FIG. 8b depicts the resultant of the combination of the fields from coils 72 and 74, which is referred to as field B–X; and, FIG. 8c depicts the resultant of the combination of the fields from coils 71 and 73 which is referred to as field B–Y. It should be noted that in view of coils, fields B–X and B–Y fluctuate cyclically 180° out of phase with each other. It should also be noted that neither of these flux density curves drops below the zero axis at any time and, thus, there is no reversal of flux direction in the core in the present process embodiment TB. Reversal of flux direction in the core is beneficially, and in some instances necessarily, avoided in order to prevent detrimental effects such as electromechanical harmonics, frequency doubling and/or loss in amplitude of vibration. Inasmuch as fields B–X and B–Y result from the mutually orthogonal coils in transducer TB and the flux paths of these fields intersect perpendicularly to each other in core 77, and fields B–X and B–Y are mutually 180° out of phase, it is evident that process TB has the effect of applying to the magnetostrictive core two mutually perpendicular, cyclically fluctuating, electromagnetic fields which fluctuate in a 180° out-of-phase relationship to each other. Magnetostrictive action of the electromagnetic fields provided in process TB vibrates the core of the transducer and, with the present process, the major vibration amplitudes are in circumferential and radial vibrations resulting from longitudinal magnetostriction in coils 72 and 74 and cyclically alternate transverse magnetostriction around coils 71 and 73.

Figure 8D:
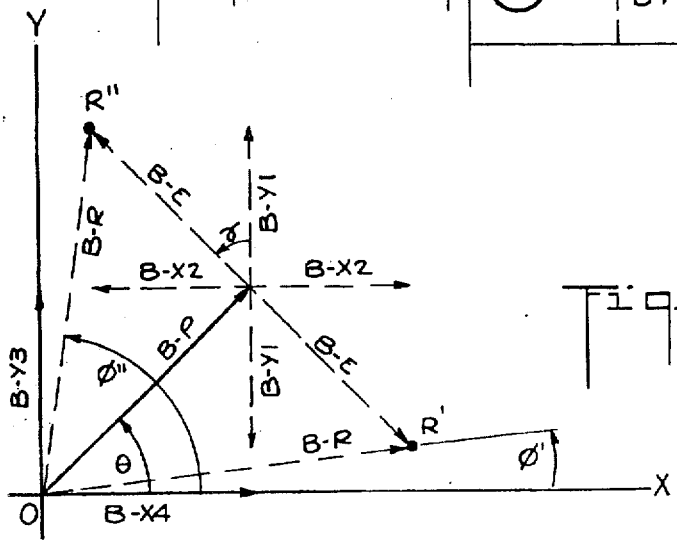

In conjunction with further description of the process, and variations thereof, provided by the invention, FIG. 8d shows vectors which depict electromagnetic field relationships in process TB. Referring to FIG. 8d, the X-axis corresponds to a line tangential to a circumferential circle in the annular core at a point where the orthogonal fields from the coils of transducer TB intersect mutually perpendicularly in the core (and thus the X-axis also corresponds to the incremental direction of the X-field); the origin O is at the point of tangency; and the Y-axis corresponds to the direction of the toroidal electromagnetic field (the Y-field) at the point of tangency and accordingly is perpendicular to the plane of the core annulus. Speaking more generally, the X-axis is aligned with the major axis or path of magnetostrictive material, which usually corresponds to the desired direction of mechanical power and, in reference to a transducer having a relatively long straight core, the X-axis is usually aligned on or parallel to the longitudinal axis of the core. For instance, in relation to transducer 40 illustrated in FIGS. 4, 5 and 6, the X-axis is on or parallel to the longitudinal center line of core 41; also in such an instance, the Y-axis is perpendicular to the planes of the two sections of coil 43. Referring again to process TB, the electromagnetic fields applied to the core from coils 71, 72, 73 and 74 are depicted by vectors B–Y1, B–X2, B–Y3 and B–X4 respectively. The resultant constant intensity field, which may also be referred to as the static polarization field, provided by the coaction of fields B–Y3 and B–X4 is depicted by vector B–P. The angle of inclination of vector B–P from the X-axis is referred to as angle theta ($\theta$) and in the present example is controlled to be 45° inasmuch as fields B–Y3 and B–X4 are controlled to be mutually equal and perpendicular. Vectors B–Y1 and B–X2 depict the respective fluctuating fields when coacting with the constant fields. In this connection it is especially noted that inasmuch as coils 71 and 72 are specially connected in opposition to each other in relation to coils 73 and 74, the fluctuating vector B–Y1 is at its maximum in the positive direction (upward) and thus is directed in the same direction as the constant vector B–Y3 at the times when the fluctuating vector B–X2 is at its maximum in the negative direction (leftward) and thus is directed opposite to the constant vector B–X4; and, in the other portion of the alternating current cycle, B–Y1 alternates to its negative peak value while B–X2 alternates to its positive peak value. Accordingly, coaction of fields B–Y1 and B–X2 provides the fluctuating resultant field depicted by vectos B–E. The angle of inilination of vctor B–E from the Y-axis is referred to as angle gamma ($\gamma$) and in the present example is controlled to be 45° by controlling fields B–Y1 and B–X2 to be mutually equal and perpendicular. Accordingly, the B–E field vector is perpendicular to the B–P field vector. The resultant of fields B–P and B–E and thus the resultant field produced by coaction of the four fields B–Y1, B–X2, B–Y3 and B–X4 controlled in accordance with the present process TB is depicted by vector B–R which extends from the origin O to vector B–E. During a full cycle of the alternating current applied to coils 71 and 72 in the present process, vector B–R oscillates angularly, or swings, through angle phi ($\phi$) between the angular positions $\phi'$ and $\phi''$, as illustrated in FIG. 8d, with the forward tip of the vector moving from point R′ to point R″ and returning back to R′ along the line of vector B–E without crossing either the X-axis or the Y-axis at any time in the cycle. Thus the angular oscillation of the resultant vector is maintained within the positive X–Y quadrant.

It should also be noted that during oscillation of vector B–R between angles $\phi'$ and $\phi''$, the length of the vector varies, thus indicating fluctuation of the resultant field intensity.

Since the direction of the resultant field vector B–R depicts the direction of the axis of magnetization of the resultant field produced from the four coils, it is evident that the axis of magnetization applied to the core swings through an angle of about but not greater than 90°, e.g., 85°, and back again, during one cycle of alternating current in the process. Thus the process cyclically polarizes the core alternately in directions substantially in the X-axis direction and then in the Y-axis direction and then back to the X-axis direction.

At a time in the cycle when the axis of magnetization is aligned substantially along the X-axis, longitudinal magnetostriction resulting from polarization of the annular nickel core along the X-axis contracts the core circumferentially with negative magnetostrictive strain. Then, during progression of the cycle, the axis of magnetization swings toward the Y-axis and consequently the longitudinal magnetostriction and the contraction of the core progressively decrease to a minimum, or zero, which may be reached at about 60° to 65° inclination of the magnetostriction axis from the X-axis. As the cycle continues and the axis of magnetization swings further from the X-axis approaches the Y-axis, transverse magnetostriction resulting from polarization of the core in the Y-axis direction expands the core circumferentially with positive magnetostrictive strain. The peak expansion is reached when the magnetization axis is aligned substantially along the Y-axis, as depicted by B–R″. In the second half of the cycle the direction of swinging the magnetization axis is reversed, the aforementioned expansion and contraction of the core circumference are accordingly reversed and thus the core circumference returns the contracted configuration existent when the magnetization axis was aligned along the X-axis at the beginning of the present illustrative cycle. Thus, in the present process cycle, the core is vibrated radially with alternate contraction and expansion of the circumference and the peak-to-peak amplitude of the vibration is the result of the combination of the longitudinal and the transverse magnetostrictive strains produced by the electromagnetic fields applied to the core.

In carrying the invention into practice to achieve especially high amplitudes of vibration it is specially advantageous to control the field intensities to provide that the static polarization angle theta is about 45°, that the resultant veld vector B–R oscillate as nearly as practical from the X-axis to the Y-axis without crossing either axis and that the flux density (intensity) of the resultant field B–R reach the magnetostrictive saturation level of the magnetostrictive material in the core when the resultant vector B–R is at the extremities of its oscillation (corresponding to angles $\phi'$ and $\phi''$), which are at the times when the vector is at its closest approaches to the X-axis and to the Y-axis and is at its maximum length.

Accordingly, it is understood that where the paramount need is to achieve maximum power output density, the apparatus and process are adapted to ascillate the manetic axis throughout an angle of substantially 90° from the power output axis (represented herein by the phi angle range and the X-axis respectively) and to control the peak flux density of the resultant field B–R to equal the magnetostriction saturation flux level.

For other circumstances of need, where the maximum obtainable power output is not essential and certain other electromechanical characteristics, such as electromechanical linearity, electromechanical coupling or electromechanical efficiency, or bandwidth, are important, and inasmuch as operating conditions for maximum power output density do not always provide optimum levels of these other electromechanical characteristics, the invention provides special embodiments whereby the range of oscillation of the magnetic axis and the peak intensity of the resultant field are specially restricted to obtain specially beneficial combinations of such characteristics along with good (although not the highest) power output density. For obtaining particularly good electromechanical linearity, electromechanical coupling and bandwidth, and possibly somewhat better electromechanical efficiency, the peak flux densities of the exciter fields B–Y1 and B–X2 are reduced (but maintained mutually equal) in proportion to the flux densities of the static fields B–Y3 and B–X4, respectively, e.g., an exciter-field to static-field proportion in the range of about 1:3 to about 1:4, which may be done by decreasing the number of turns and/or the current flow equally in coils 71 and 72, e.g., with the circuit adapted to provide that the ratio of the inductances of coils 71 and 72 to the inductances of coils 73 and 74 respectively is about 1:3 to about 1:4. With the peak flux densities of the exciter fields thus reduced, the amplitude of vector B–E is reduced and the angular range of oscillation of the axis of magnetization throughout angle phi is reduced, e.g., to a range of about 25° to about 65° or 30° to 60° from the power output axis; accordingly, the peak flux density of the resultant field B–R is decreased relative to the flux density of the constant field.

Further benefits, especially in electromechanical efficiency and possibly also in linearity, may be obtained by increasing the inclination angle theta of the static field to greater than 45°, e.g., about 65°, 70° or 75°, which may be accomplished by increasing the ratio of the flux density of the B–Y3 field to the flux density of the B–X4 field, e.g., to about 2:1 to about 4:1 or 3:1; advantageously, for high electromechanical efficiency, angle theta is as large as it may be without having vector B–E cross the Y-axis. Of course, the peak intensity of the exciter field resultant B–E is maintained sufficiently high to provide the vibrational power requirement for the transducer, which is understood to be for moderate power output at high efficiency. Further in connection with obtaining high electromechanical efficiency, it can be beneficial to decrease the strength of the transverse exciter field B–Y1 in relation to the longitudinal exciter field B–X2, thereby increasing angle gamma, which is usually at least 45° and is advantageously made equal to the theta angle in order to benefit mechanical output, to greater than 45° and possibly up to near 90°, e.g., 85°, particularly if the theta angle is relatively high, e.g., 65° to 85°. For instance, the ratio of the peak flux density of field B–Y1 to that of field B–X2, or the ratio of the inductances or of the numbers of turns in coil 71 to coil 72, can be about 1:2 or 1:3 or possibly 1:4, or, in a somewhat simplified version of the apparatus, coil 71 may be deleted if the static field angle is high and the power requirement is only moderate. In general, for these special advantages, where high electromechanical efficiency is especially needed, the angular range of oscillation of the axis of magnetization is maintained at high angles of inclination from the power axis, e.g., oscillation through angular ranges of about 70° to 90° or of about 75° to 87°, from the power output axis.

Although the electromagnetic functioning of transducer TB and modification thereof are described in connection with the circuit 70 illustrated in FIG. 7 it will be understood that in the light of the teachings herein, somewhat different arrangements of coils and power sources and leads may be utilized for performing most or possibly all of the functions of circuit 70. For instance, structural variations of the arrangement of circuit 70 that may be utilized for the invention include providing a separate direct-current power source for each of coils 73 and 74, connecting coils 71 and 72 in parallel instead of in series (provided the aforedescribed opposition relationship is maintained), or, using a single coil connected in common to the alternating-current and direct-current power sources in place of coils 72 and 74, e.g., by deleting coil 74 and connecting direct-current source 76 and coil 73 in series across coil 72 and inserting a blocking capacitor between alternating-current source 75 and coil 72 to block flow of current from direct-current source 76 to alternating-current source 75.

Although embodiments having both fluctuating and constant fields, such as illustrated in FIG. 7, have some desirable features, particularly for adaption to special purposes at low or moderate power output, the rectified power circuit illustrated in FIG. 3 is especially most advantageous for achieving highest power output density and is also advantageous for obtaining substantially resistive load characteristics, avoiding need to provide direct-current power and overcoming flux reversal difficulties.

While the invention has been illustrated in connection with conversion of electrical energy to mechanical energy, it will be understood that embodiments of the apparatus and process of the invention may also be used for converting mechanical energy to electrical energy. For instance, a transducer having a magnetostrictive core and orthogonal coils in accordance with the invention can be subjected to mechanical strain, e.g., by anisotropic pressure deformation, and variations in magnetic flux surrounding the core can be picked up or sensed with the orthogonal coils to transmit electrical energy, e.g., for acoustic or other pressure variation measurements.

The present invention is particularly applicable to magnetostrictive transducers for sonar transmission and reception, driving vibratory tools or tool bits including trepanning drills, rock drills, core drills and mining or oil well drills and for providing vibration for pile drivers, riveters, welders, soldering irons, ultrasonic cleaners and dental or surgical drilling and/or cutting tools and is also applicable to providing vibration for metal forming processes, e.g., tube drawing or extruding. The invention is useful for providing vibratory power at sonic and ultrasonic frequencies, such as from about 20 Hz. or 50 Hz to about 20,000 Hz. and up to higher frequencies of 50,000 Hz. or 100,000 Hz. or possibly even higher, and also at moderately subsonic frequencies, e.g., 10 Hz. The invention is especially applicable to electromechanically vibrating cores formed in hollow closed-path configurations that provide a continuous, or substantially or essentially continuous, closed path or loop of material around a central opening, e.g., the closed path or loop around the perimeter of a circle, oval or rectangle, and have a continuous interior cavity or passage extending within the material and around the central opening, it being understood that hollow refers to the interior, substantially enclosed, cavity or passage and not to the central opening. Illustratively, a hollow annular cylindrical core has a cylindrical configuration with a central opening extending axially through the cylinder and an annular passage enclosed within the cylinder and extending around the central opening. The invention is applicable with core structures that are substantially continuously of magnetostrictive material and also with laminated magnetostrictive structures, e.g., planar laminates, cylindrical or annular laminates, or scroll laminates, or combinations thereof, with or without electrically insulating materials, nonmagnetic materials or different magnetic or magnetostrictive materials between the laminations.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

[1. An electromechanical transducer for converting electrical power to vibratory mechanical power and for exerting a major proportion of said vibratory mechanical power along an axis of desired power output comprising a core containing bilinear magnetostrictive material and extending along the axis of desired power output, a first electrically conductive coil adapted to be electromagnetically coupled with the core when electric current is passed through the coil and to thereby produce a first electromagnetic field having a flux directed along said desired axis of power output and a second electrically conductive coil adapted to be electromagnetically coupled with the core when electric current is passed through said second coil and to thereby produce a second electromagnetic field having flux intersecting the core in a direction transverse to the direction of flux intersecting the core from the first coil.]

[2. An electromechanical transducer as set forth in claim 1 wherein the core is of an elongated rod configuration, one of the coils is wound toroidally around the rod and the other coil is wound in an elongated loop cnfigurati n and is disposed with the length of the loop substantially parallel to the length of the rod.]

3. An electromechanical transducer [as set forth in claim 1 wherein the] *for converting electrical power to vibratory mechanical power and for exerting a major proportion of said vibratory mechanical power along an axis of desired power output comprising: a core containing bilinear magnetostrictive material and extending along the axis of desired power output, said* core [is] *being* of a hollow closed-path configuration providing a substantially continuous path of core material around a central opening and having a continuous interior cavity extending within the core material and coextensively with the path of core material around the central opening, *a first electrically conductive coil adapted to be electromagnetically coupled with the core when electric current is passed through the coil and to thereby produce a first electromagnetic field having flux directed along said desired axis of power output and a second electrically conductive coil adapted to be electromagnetically coupled with the core when electric current is passed through said second coil and to thereby produce a second electromagnetic field having flux intersecting the core in a direction transverse to the direction of flux intersecting the core from the first coil,* one of the coils [is] *being* wound within the cavity and coextensively with the path of the cavity and [has] *having* electrically conductive leads extending to the exterior of the cavity and the other *of the coils* [is] *being* wound toroidally around the exterior of the path of core material.

4. An electromechanical transducer as set forth in claim [1] 3 wherein the magnetostrictive material is characterized by a saturation Joule magnetostrictive strain of at least about 10 parts per million.

5. An electromechanical transducer comprising a hollow annular cylindrical core containing bilinear magnetostrictive material and having a cylindrical configuration with a central opening extending axially through the cylinder and a continuous annular cavity substantially enclosed within the cylinder and extending around the central opening, an electrically conductive exterior toroidal coil wound toroidally through the central opening and around the exterior of the cylinder and an electrically conductive interior circumferential coil wound annularly within the cavity and having electrically conductive leads extending to the exterior of the cavity.

6. An electromechanical transducer as set forth in claim 5 wherein the ratio of the axial thickness (T) to the diameter (D), the T:D ratio, of the cylindrical core configuration is less than 1:1.

7. An electromechanical transducer as set forth in claim 5 wherein the ratio of the axial thickness (T) to the diameter (D), the T:D ratio, of the cylindrical core configuration is at least 1:1.

8. A transducer as set forth in claim 5 wherein the core has a continuous slit through a wall of the cavity and said slit is parallel to the windings of the interior circumferential coil.

9. An electromechanical transducer apparatus comprising a core containing bilinear magnetostrictive material, two electrically conductive coils adapted to produce two mutually transverse electromagnetic fields and direct electromagnetic flux from each of the coils into the core and thereby magnetize the core when electric currents are passed through the coils, and means for passing electric currents through each of the two coils and for controlling the coil currents to cyclically vary the flux density of [at least one] *each* of the fields to angularly oscillate the direction of magnetization of the core within an angle of up to 90°.

10. An electromechanical transducer apparatus as set forth in claim 9 wherein the means for passing and controlling the currents through the two coils comprises an alternating-current source and rectifying means for passing current from the alternating-current source unidirectionally through one coil during one portion of the alternating-current cycle and then unidirectionally through the other coil during another portion of the alternating-current cycle to thereby cyclically vary the flux density to each of the electromagnetic fields produced from the two coils and maintain a 180° out-of-phase relationship between the cyclic variations of the flux densities of the two fields.

[11. An electromechanical transducer apparatus as set forth in claim 9 wherein the means for passing and controlling the currents through the two coils comprises an alternating-current source arranged with electrically conductive leads adapted to transmit alternating current through one of the coils and thereby energize said coil to produce a cyclically varying electromagnetic field, a constant-current direct-current source arranged with electrically conductive leads adapted to transmit constant direct current through the two coils in series and thereby constant electromagnetic fields and wherein the current sources and the coils are adapted to provide that the flux density of the constant field produced from the coil also energized by the alternating current is at least as great as the peak intensity of the alternating-current field during any opposing portion of the alternating-current cycle.]

12. A magnetostrictive transducer apparatus comprising:

a. a core containing bilinear magnetostrictive material;

b. a first coil having a first coil input lead and a first coil output lead and adapted to direct electromagnetic flux into the core when electric current is transmitted through the coil;

c. a second coil having a second coil input lead and a second coil ouput lead and adapted to direct electromagnetic flux, when current is transmitted through the second coil, into the core in a direction transverse to flux directed into the core by the first coil;

d. a first terminal junction conductively joining the first coil output lead to the second coil input lead;

e. a first unidirectional current conducting means adapted to conduct electric current to the first input lead;

f. a second unidirectional current conducting means adapted to conduct electric current from the second output lead; and g. a second terminal junction adapted to conduct current to the first unidirectional current conducting means and to conduct current from the second unidirectional current conducting means; and h. an alternating-current source electrically connected between the first and second terminal junctions.

13. A process for electromechanically converting electrical power to mechanical power exerted along a desired power output axis comprising providing a core containing bilinear magnetostrictive material *formed in a hollow closed-path configuration extending around a central opening* and extending along the axis of desired power output, applying to said core two mutually transverse electromagnetic fields, *at least one of which comprises a continuous closed path of flux around the central opening,* to thereby magnetize the core with a resultant magnetic field having an axis of magnetization in the core, cyclically fluctuating the intensity of [at least one] *each* of the two electromagnetic fields to cyclically oscillate the axis of magnetization within an angular range of up to 90° from the axis of desired power output and thereby magnetostrictively vibrate the core along the axis of desired power output at the cyclic frequency of the cyclically fluctuating field.

14. A process as set forth in claim 13 wherein the magnetic axis is oscillated substantially throughout an angular range of about 90° but not greater than 90° from the axis of power output.

15. A process as set forth in claim 14 wherein the two fields intersect mutually perpendicularly within the core, both of the two fields are cyclically fluctuated 180° out of phase with each other, and the peak intensities of the two fluctuating fields are maintained mutually equal in magnitude.

16. A process as set forth in claim 13 wherein the magnetic axis is oscillated within an angle of about 25° to 65° from the axis of desired power output.

17. A process as set forth in claim 13 wherein the magnetic axis is oscillated within an angle of about 70° to 90° from the axis of desired power output.

*18. A process as set forth in claim 13 wherein both of the fields are cyclically fluctuated 180° out of phase with each other and each of the fields is fluctuated from zero to the magnetostriction saturation flux level of the core material, or from near zero to near saturation, while maintaining the 180° out of phase relationship and avoiding reversing the flux direction and avoiding exceeding the saturation level.*

References Cited

The following references, cited by the Examiner, are of record in the patented file of this patent or the original patent.

UNITED STATES PATENTS

| | | | |
|---|---|---|---|
| 2,876,419 | 3/1959 | Gianola et al. | 310—26 X |
| 2,472,388 | 6/1949 | Thuras | 310—26 X |
| 2,776,416 | 1/1957 | Harris | 310—26 X |
| 2,730,103 | 1/1956 | Mackta | 310—26 X |
| 3,515,965 | 6/1970 | Semmelink | 310—26 X |
| 3,470,402 | 9/1969 | Abbott | 310—26 |

DONOVAN F. DUGGAN, Primary Examiner

U.S. Cl. X.R.

310—26

UNITED STATES PATENT OFFICE

CERTIFICATE OF CORRECTION

PATENT NO. : Re.28,381

DATED : April 1, 1975

INVENTOR(S) : ALDEN P. EDSON

It is certified that error appears in the above-identified patent and that said Letters Patent are hereby corrected as shown below:

Col. 1, line 44, for "circumsferentially" read --circumferentially--.

Line 63, for "acoutic" read --acoustic--.

Col. 6, line 13, for "the" read --this--.

Line 18, for "respectively" read --repetitively--.

Col. 11, line 23, delete "the" first occurrence.

Between lines 53 and 54 insert --the aforementioned special winding and connection of the--.

Col. 12, line 50, for "vectos" read --vector--.

Line 51, for "inilination" read --inclination--.

Line 51, for "vctor" read --vector--.

Col. 13, line 21, for "magnetostriction" read --magnetization--.

Line 23, insert "and" before the word "approaches".

Line 32, insert "to" before the word "the".

Line 46, for "veld" read --field--.

Line 57, for "ascillate" read --oscillate--.

Lines 57 and 58 for "manetic" read --magnetic--.

-Continued on Sheet 2-

UNITED STATES PATENT OFFICE

CERTIFICATE OF CORRECTION

PATENT NO. : Re.28,381

DATED : April 1, 1975

INVENTOR(S) : ALDEN P. EDSON

It is certified that error appears in the above-identified patent and that said Letters Patent are hereby corrected as shown below:

Col. 17, line 17 (line 10 of claim 10) for "to" read --of--.

Between lines 29 and 30 (between lines 10 and 11 of claim 11) insert --energize both coils to produce two mutually transverse--.

Signed and Sealed this

*twenty-third* Day of *September 1975*

[SEAL]

*Attest:*

RUTH C. MASON
*Attesting Officer*

C. MARSHALL DANN
*Commissioner of Patents and Trademarks*